US006950853B2

(12) United States Patent
Garcia-Luna-Aceves et al.

(10) Patent No.: US 6,950,853 B2
(45) Date of Patent: Sep. 27, 2005

(54) MULTISITE COORDINATION IN SHARED MULTICAST TREES

(75) Inventors: Jose Joaquin Garcia-Luna-Aceves, San Mateo, CA (US); Hans-Peter Dommel, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 825 days.

(21) Appl. No.: 09/892,708

(22) Filed: Jun. 26, 2001

(65) Prior Publication Data

US 2002/0035602 A1 Mar. 21, 2002

Related U.S. Application Data

(60) Provisional application No. 60/214,327, filed on Jun. 27, 2000.

(51) Int. Cl.[7] ................................................ B06F 15/16
(52) U.S. Cl. ...................................... 709/204; 370/260
(58) Field of Search ............................... 709/204–207, 709/230, 238; 370/260, 262

(56) References Cited

U.S. PATENT DOCUMENTS

| | | | | |
|---|---|---|---|---|
| 5,268,838 A | * | 12/1993 | Ito | 700/99 |
| 5,442,788 A | * | 8/1995 | Bier | 715/751 |
| 5,557,725 A | * | 9/1996 | Ansberry et al. | 715/755 |
| 5,617,539 A | * | 4/1997 | Ludwig et al. | 709/205 |
| 5,844,553 A | * | 12/1998 | Hao et al. | 715/733 |
| 5,884,039 A | * | 3/1999 | Ludwig et al. | 709/227 |
| 6,006,253 A | * | 12/1999 | Kumar et al. | 709/204 |
| 6,189,043 B1 | * | 2/2001 | Buyukkoc et al. | 709/241 |
| 6,230,171 B1 | * | 5/2001 | Pacifici et al. | 715/512 |
| 6,584,493 B1 | * | 6/2003 | Butler | 709/204 |
| 6,728,777 B1 | * | 4/2004 | Lee et al. | 709/238 |
| 6,757,294 B1 | * | 6/2004 | Maruyama | 370/432 |
| 2001/0025299 A1 | * | 9/2001 | Chang et al. | 709/204 |

FOREIGN PATENT DOCUMENTS

| | | | | |
|---|---|---|---|---|
| EP | 1 096 740 | * | 2/2001 | H04L/12/56 |

OTHER PUBLICATIONS

Dommel, Hans–Peter, Garcia–Luna–Aceves, J.J.; "Floor Control for Multimedia Conferencing and Collaboration," Multimedia Systems Journal (ACM/Springer), vol. 5, No. 1, pp. 23–38, Jan., 1997.

Deering, S.; Host Extensions for IP Multicasting, Request for Comments–1112, Network Working Group, Stanford University, pp. 1 thru 15, Aug., 1989.

Dommel, Hans–Peter, Garcia–Luna–Aceves, J.J.; "Network Support for Turn–Taking in Multimedia Collaboration," Proc. IS&T SPIE Multimedia Computing and Networking, pp. 304–315, San Jose, CA, Feb., 1997.

Yavatkar, Raj and Lakshman, K.; "Communication Support for Distributed Collaborative Applications," (ACM/Springer), vol. 2, No. 2, pp. 1–34, Jul., 1994.

(Continued)

*Primary Examiner*—Bunjob Jaroenchonwanit
(74) *Attorney, Agent, or Firm*—John P. O'Banion (57) ABSTRACT

A protocol to coordinate multipoint groupwork in the IP-multicast framework. Called Aggregated Coordination Protocol (ACP), the protocol operates on a shared multicast tree, benefiting from the underlying tree structure to store and forward coordination primitives between hosts in different multicast groups on the tree. ACP coordinates distributed activities via message passing, and manifests control by ephemeral permissions rather than actual locks, allowing control over continuous media flows as well as discrete data. The protocol supports Internet-wide coordination for large and highly interactive groupwork, relying on transmission of coordination directives between group members across a shared end-to-end multicast tree.

58 Claims, 2 Drawing Sheets

OTHER PUBLICATIONS

Abdel–Wahab, Hussein M., Guan, Sheng–Uei, Nievergelt, Jay; "Shared Workspaces for Group Collaboration: An Experiment Using Internet and Unix Interprocess Communications," IEEE Comm. Mag., vol. 26, No. 11, pp. 10–16, Nov., 1988.

Aguilar, L., Garcia–Luna–Aceves, J.J., et al.; "Architecture for a Multimedia Teleconferencing System," Proc. ACM SIGCOMM, pp. 126–136, Aug., 1986.

Schooler, E.M.; "Conferencing and Collaborative Computing," Multimedia Systems Journal, (ACM/Springer) vol. 4, No. 5, pp. 210–225, Oct. 1996.

Handley, M. and Jacobson, V.; "SDP: Session Description Protocol," Request for Comments–2327, Network Working Group, Stanford University, pp. 1 thru 24, Apr., 1998.

Ellis, C.A. et al.; "Groupware–Some Issues and Experiences," Comm. of the ACM, vol. 34, No. 1, pp. 38–58, Jan., 1991.

Craighill, E. et al., "CECED: A System for Informal Multimedia Collaboration," Proceedings ACM Multimedia, pp. 437–445, Anaheim, CA, Aug., 1993.

Ziegler, C. et al., "Implementation Mechanisms for Packet Switched Voice Conferencing," IEEE Journal on Selected Areas in Communications, vol. 7, No. 5, pp. 698–706, Jun., 1989.

Yavatkar, R.; "MCP: A Protocol for Cordination and Temporal Synchronization in Multimedia Collaborative Applications," Proceedings of the 12th IEEE International Conference on Distributed Applications, pp. 1–9, Jun., 1991.

Rangan, P.V. et al.; "Communication Architectures and Algorithms for Media Mixing in Multimedia Conferences," IEEE/ACM Trans. on Networking, vol. 1, No. 1, pp. 20–30, Feb., 1993.

Malpani, R. et al.; "Floor Control for Large Mbone Seminars," Proceedings ACM Multimedia, pp. 155–163, Seattle, WA, Nov., 1997.

Ahuja, S.R. et al.; "Coordination and Control of Multimedia Conferencing," IEEE Communications Magazine, vol. 30, No. 5, pp. 38–43, May, 1992.

Levine, B.N. and Garcia–Luna–Aceves, J.J., "Improving Internet Multicast with Routing Labels," Proceedings IEEE International Conference on Network Protocols, pp. 241–250, Atlanta, GA, Oct., 1997.

Levine, Brian N. et al., "The Case for Reliable Concurrent Multicasting Using Shared ACK Trees," Proceedings ACM Multimedia, pp. 365–376, Boston, MA, Nov., 1996.

Floyd, Sally, et al.; "A Reliable Multicast Framework for Light–Weight Sessions and Application Level Framing," Proceedings ACM/SIGCOMM, pp. 342–356, Cambridge, MA, Aug./Sep., 1995.

Yavatkar, R. et al., "A Reliable Dissemination Protocol for Interactive Collaborative Applications," Proceedings ACM mUltimedia, pp. 333–344, San Francisco, CA, Nov., 1995.

Barghouti, Naser S. et al.; "Concurrency Control in Advanced Database Applications," ACM Computing Surveys, vol. 23, No. 3, pp. 269–317, Sep., 1991.

Crowley, T. et al.; "MMCONF: An Infrastructure for Building Shared Multimedia Applications," Proceedings ACM/CSCW, pp. 637–650, Los Angeles, CA, Oct., 1990.

Raymond, Kerry, "A Tree–Based Algorithm for Distributed Mutual Exclusion," ACM Trans. on Computer Systems, vol. 7, No. 1, pp. 61–77, Feb., 1989.

Neilsen, M.L. and Mizuno M., "A Dag–Based Algorithm for Distributed Mutual Exclusion," 11th International Conference on Distributed Computing Systems, pp. 354–360, Arlington, TX, May, 1991.

Singhal, M.; "A Taxonomy of Distributed Mutual Exclusion," Journal of Parallel and Distributed Systems, vol. 18, No. 1, pp. 94–101, May, 1993.

Isaacs, E.A. and Tang, J.C.; "What Video Can and Cannot do for Collaboration: A Case Study," Multimedia Systems Journal, vol. 2, No. 2, pp. 63–73, Aug., 1994.

Vin H.M. et al.; "Hierarchical Conferencing Architectures for Inter–Group Multimedia Collaboration," ACM/SIGOIS Bulletin Proceedings Org. Computer Systems, pp. 43–54, Atlanta, GA, Nov., 1991.

Steinmetz, R., "Synchronization Properties in Multimedia Systems," IEEE Journal on Selected Areas in Communication, vol. 8, No. 3, pp. 401–411, Apr., 1990.

Metz, Christopher, "Reliable Multicast: Whey Many Must Absolutely Positively Receive IT," IEEE Internet Computing, vol. 2, No. 4, pp. 9–13, Jul.–Aug., 1998.

Paul, S., Sabnani, K.K., Lin, J. C–H, and Bhattacharyya, S.; "Reliable Multicast Transport Protocol, (RMTP)," IEEE Journal on Selected Areas in Communication, vol. 15, No. 3, pp. 407–421, Apr., 1997.

Dommel, Hans–Peter and Garcia–Luna–Aceves, J.J.; "Efficacy of Floor Control Protocols in Distributed Multimedia Collaboration," Cluster Computing, vol. 2, pp. 17–33, (1999).

* cited by examiner

FIG. 3

MULTISITE COORDINATION IN SHARED MULTICAST TREES

CROSS-REFERENCE TO RELATED APPLICATIONS

This application claims priority from U.S. provisional application Ser. No. 60/214,327 filed on Jun. 27, 2000, incorporated herein by reference.

STATEMENT REGARDING FEDERALLY SPONSORED RESEARCH OR DEVELOPMENT

This invention was made with Government support under Grant Nos. F30602-27-0338 and F30602-97-2-0338, awarded by the Air Force Office of Scientific Research, Defense Advanced Research Projects Agency (DARPA). The Government has certain rights in this invention.

REFERENCE TO A MICROFICHE APPENDIX

Not Applicable

BACKGROUND OF THE INVENTION

1. Field of the Invention

This invention pertains generally to multicast transmission, and more particularly to a protocol to coordinate multipoint groupwork in the IP-multicast framework.

2. Description of the Background Art

Internet computing is gradually migrating from the standard unicast transmission model to multicasting. In the IP multicasting model, a source needs to send a packet only once to the network interface, and multicast routers replicate the packet on its transmission path to multiple receivers. The Internet Group Management Protocol (IGMF) allows a host to join a multicast group by informing its local router to forward multicast traffic for this group to the leaf subnetwork where the host resides. Protocols such as DVMRF, MOSFF, and PIM perform the construction of multicast delivery trees and enable packet forwarding between routers.

With IP multicast, no guarantees are given for reliable or order-preserving delivery of packets, and a message is delivered on a best effort basis to all members of a multicast group. These shortcomings have spurred much research on reliable multicast between end hosts, and on mechanisms to refine IP multicast, such as using addressing information to enable subcasting or anycasting. Subcasting delivers or retrieves data between a source and select members of a multicast group, and anycasting transfers data to anyone member of a group, for example the nearest proxy from a group of servers. While IGMP targets group membership, and multicasting routing protocols are concerned with delivery, no protocols exist to tackle an emerging problem of multisite communication, which is group coordination. This problem surfaces especially for tightly coupled sessions featuring explicit conference membership control.

Group coordination denotes services to support distributed hosts in coordinating their joint activities, including synchronization of flows from different sources, ordered delivery of distributed event information, and the concurrent use of and access to shared resources, referred to as floor control.

Early paradigms of group coordination, mutual exclusion, or concurrency control, have been restricted to discrete data domains rather than multimedia contents, using locking to manifest control, and have not been deployed on an Internet scope. Online group coordination in relation to face-to-face meetings has been studied, and those studies show that greediness for time and bandwidth on behalf of non-cooperative users, as well as lack of social cues such as eye contact contribute to coordination problems. While geared toward supporting humans in their interactions, the concept of group coordination also applies to agent-based interaction. For example, methods to mediate resource contention at the user interface level are known. However, many existing systems for online collaboration are proprietary, sparsely documented, and limited to local area networks, or sessions with few users. These include token-based control mechanisms for a shared workspace, as well as systems in which distributed, task-activated floor control serves as a high-level analogy to collision-sensing in channel access.

Various other techniques have been developed as well, such as packet-switched voice conferencing in a broadcast and unicast setting, ITU standards 120 and 320 for video conferencing that are circuit-switched and designed for conferences with few users, the MCP coordination protocol between concurrent media flows based on token passing, frameworks for hierarchical collaboration looking at bandwidth and delay issues, mutual exclusion algorithms operating on a static logical propagation tree in which nodes maintain a pointer to the neighbor node that leads to the current token holder with access to the critical section, adding a dynamic link between a requester and the token holder to avoid backtracked routing of reply messages between a source and target node.

Notwithstanding the foregoing, there is a need to address how routing and end-to-end geometry used for multicasting data can also be used effectively for coordinating the activities among individuals and in sessions of Internet scope. The present invention satisfies that need, as well as others, and overcomes deficiencies in existing group coordination protocols.

BRIEF SUMMARY OF THE INVENTION

In general terms, the present invention is a group coordination method which will be referred to herein as Aggregated Coordination Protocol (ACP). By way of example, and not of limitation, ACP operates on a shared multicast tree, benefiting from the underlying tree structure to store and forward coordination primitives between hosts in different multicast groups on the tree. ACP coordinates distributed activities via message passing, and manifests control by ephemeral permissions rather than actual locks, allowing control over continuous media flows as well as discrete data.

An object of the invention is to provide a coordination mechanism based on IP multicast.

Another object of the invention is to provide a group coordination protocol that can be used for collaborative Internet or Intranet applications.

Another object of the invention is to provide a protocol that is based on a logical control tree, and scales to large groups.

Another object of the invention is to provide a protocol that is a standalone mechanism but which can rely on an underlying end-to-end reliable multicast tree.

Another object of the invention is to eliminate the need to build a separate control structure for tracking, routing, withholding, or forwarding control directives.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Figure 1:
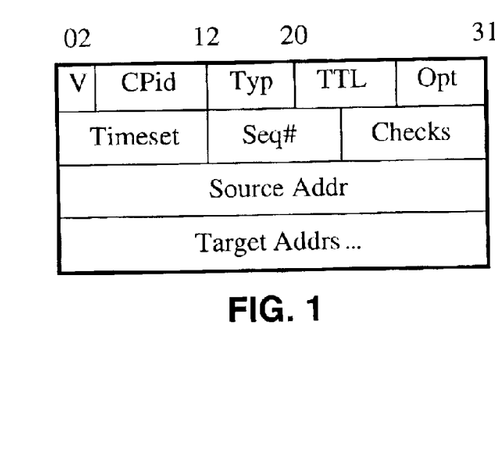
FIG. 1 is a diagram showing the structure of a packet header fields for coordination primitive packet according to the present invention.

For illustrative purposes the present invention will now be described with reference to FIG. 1 through FIG. 3.

The present invention, which we refer to as Aggregated Coordination Protocol (ACP), is designed to coordinate multipoint groupwork in the IP-multicast framework by relying on transmission of coordination (control) primitives (directives) between group members across a shared end-to-end multicast tree. ACP benefits from the underlying tree structure to store and forward coordination primitives between hosts in different multicast groups on the tree, coordinates distributed activities via message passing, and manifests control by ephemeral permissions rather than actual locks, thus allowing control over continuous media flows as well as discrete data.

1. Model and Definitions

We define a coordination session $C_s=(H, L)$ as a computer network with hosts H and links $L \subset H \times H$. Communication is by message passing only, and we assume that messages eventually arrive correctly. Each host in a session is client and server for coordination primitives (CP) to other hosts. CPs are issued between hosts to synchronize their joint tasks, to implement causal or total ordering in distributed events, and to mitigate access to shared, but exclusive resources. Coordination management must be aligned with membership operations such as joining, leaving or splitting groups.

The entities involved are users (processes), resources at the various hosts, and the CPs coordinating them. Users assume social roles (e.g., moderator, panelist, student), and both users and agents assume control roles (e.g., controlling who may work with a resource, or holding the right to work with it). We call the host controlling access and operations of a resource the "floor controller" (FC) for that resource. The host being permitted to access the resource at a given moment is called the "floor holder" (FH). Resources can be located at a specific end host (e.g., camera), in replicated form at every host of a multicast group handling the same resource (e.g., telepointer), or in the network (e.g., voice channel). We distinguish between generic CPs ("grant", "release", "open") and resource or media-specific CPs ("rotate left", "zoom in"). The temporary privilege to work with a multimedia resource is also called "floor". CPs contain the sender id, the receiver ids, the time of creation, the allowed duration, and an optional priority value.

Control over shared resources can be centralized, distributed or a hybrid of both. It can be performed successively by individual session members, partitioned, where various session hosts contribute different control functions, or democratic, where consensus is achieved by negotiation, yielding a new consistent control state. A host holds a floor in his turn for a time interval T, which can be preset or timed out. In our model, we assume that the FC role is associated with a specific host, but it may infrequently rove among hosts. The FH changes at every turn. We assume that each host in a session runs the same coordination protocol, serving requests from other hosts and transmitting requests for resources placed by users or their processes.

2. Aggregated Coordination Protocol (ACP)

2.1 Description

ACP operates on a control tree, comprising three main types of nodes:

(a) holder nodes which host the FH, operating on a resource and being transmission sources;

(b) control nodes which host the FC for a specific resource, and are addressed by other nodes asking for a floor; and (c) target nodes which receive updates of the operations by a FH. In addition, nodes on the path from a holder to its targets are referred to as "hop nodes". Furthermore, "leaf nodes" terminate downward forwarding of control information in the tree. Coordination Primitives (CPs) are disseminated across a single shared tree connecting all hosts in a session. The tree corresponds to a single shared acknowledgment tree for concurrent multicasting, allowing multiple sources instead of building separate dissemination trees per source and multicast group. The tree can be a working copy of the reliable multicast tree prepared by a protocol such as Lorax. We outline tree maintenance for the case that group coordination is deployed in a network complementing an existing underlying reliable multicast tree.

Various mechanisms for initiation, joining, and advertising of collaborative sessions exist. We assume that one host, representing itself or a multicast group, initiates a session and advertises the session description, multicast address and media in use in a session directory. The directory serves as a rendezvous interface, which allows other hosts to join via a call-up mechanism. The control tree is grown from the initiating node as the root, and other hosts joining the session are considered first off tree, unicasting request-to-join messages to the inviting root node based on addressing information provided by the session directory. A TTL (time-to-live) field in the join packet restricts the session scope.

A successful adoption of a child node to the control tree is confirmed with a bind message. Each newly joined host, as the root of its subtree, locally advertises invitation-to-join messages. It may also be the case that separate subtrees may fission together to create a joint control tree. Each node in the tree has a maximum degree D, which must be high enough to reflect the session structure, but not exceed the capacity of a host to efficiently serve its children. Furthermore, if the tree serves also as a media mixing hierarchy, the permissible height must satisfy the end-to-end delay constraints.

Open sessions with dynamic membership may incur frequent joining and leaving, or accidental withdrawal of hosts from the control tree. When the root leaves the control tree, the eldest child in the subtree is the designated new root. Age may be determined by location, joining time, or address labels. A hop node, which lost contact with its parent for a timeout larger than possible congestion delays, must rejoin the tree as described. CPs from a node identified as lost are held at the processing host for a timeout and discarded if the host does not reappear. A lost and rejoined host must resend its pending CPs.

Routing of CPs in the tree is performed as follows: if a target node is in the subtree of a node, the CP is routed downward the subtree branch where the target resides, otherwise it is sent upward to its parent node. This operation could be performed by using only directionality information on where a target is located, as is the known mutual exclusion scheme. However, in contrast to a logical geometry used to propagate critical section requests, our protocol must disseminate CPs involving many resources, media types, and their coordination properties across an infrastructure prescribed by the actual underlying multicast tree.

We need therefore a more expressive addressing and control mechanism for multisite coordination among multicast groups, because many nodes may assume FC or FH roles during dynamic collaboration session. To this end, ACP assigns recursively and top-down unique prefix labels to each node joining the control tree, such that a child node label contains as prefix the label of its parent. For example, using a binary alphabet, the root receives label 1, its children are numbered 10 and 11, etc. The idea of using binary labels has first been used for routing of instructions in multiprocessor systems and has recently been applied to multicast routing and reliable multicasting. Labels allow nodes to be addressed individually, although being part of one or more possibly overlapping multicast groups. Also, hosts can be placed in the tree independent of their membership in different multicast groups, in contrast to other approaches, which demand that the tree organization reflects group membership.

Each CP contains the source's label, the target label(s), a sequence number, a local timestamp, a session wide unique resource id obtained from the session directory, and a floor id, which denotes the temporary access permission or an activity descriptor for a resource. The packet header fields and structure of a CP packet are shown in FIG. 1. CPid identifies the coordination primitive and the type of operation, characterizing various resource modalities. TTL indicates the scope of the CP. Opt is reserved for priority codings. The timer and sequence numbers tag the CP uniquely in the session and event space. Checks is the checksum field. The Sourceaddr and Targetaddrs fields contain the labels for the sender of a CP and its target nodes.

Although the initial source and root will change over the course of a session, the branching properties of the positional tree will not change, when the tree is virtually rehung with shifting of control roles. CPs such as requests for the floor on a resource are propagated across the tree using aggregation. This mechanism corresponds to the solution for the ACK implosion problem, used in reliable multicast to limit the feedback of receivers to a source on lost or corrupt packet. Aggregation limits the control process to local groups, rather than letting CPs that can be satisfied locally, flow back all the way to the holder or controller node. ACP packets are assumed to be transferred reliably, which is guaranteed by the underlying reliable multicast protocol. If ACP performs independently, it needs to supply its own reliability mechanisms.

Hosts need to maintain locally the following state: the resource IDs shared from local to the remote hosts, and the remote resource IDs accessed locally, together with their CPids; a state table indicating which resources are locally available or held remotely, together with the id of the remote FH; and a request queue ReqQ which collects successive CPs from different hosts (the queue is limited by the number of nodes in the session). If a hop node receives the same CPs from different nodes, it aggregates them into one CP, and checks if a response to these requests can be satisfied locally by polling its own state and the state of neighboring nodes. Otherwise the composite CP is self-routed up or down in the tree toward the target node(s). This implies that the number of CPs required to coordinate nodes decreases as the request activity increases, because requests are not sent further, if a hop node is reached that already processed the CP. The target address may also contain the name of a multicast group, which is then resolved into its members locally at the primary retriever node for this group. A joining node retrieves the current control state for resources of concern by polling its parent node.

In addition, each node maintains a FIFO queue of pending CPids, identified by the senders' labels. A hop node receiving a floor compares the label of the elected node with the head of the queue, and self-elects if its own label matches the head, or forwards it in the routing procedure outlined above. A control node receiving a request responds immediately to the request by sending back a grant message to the requester, if its local queue is empty, or it appends it to its queue. When control shifts from a node to another one, the pending request queue is transferred to the new control node and its new address is multicast to all groups sharing the associated resource.

EXAMPLE

Figure 2:
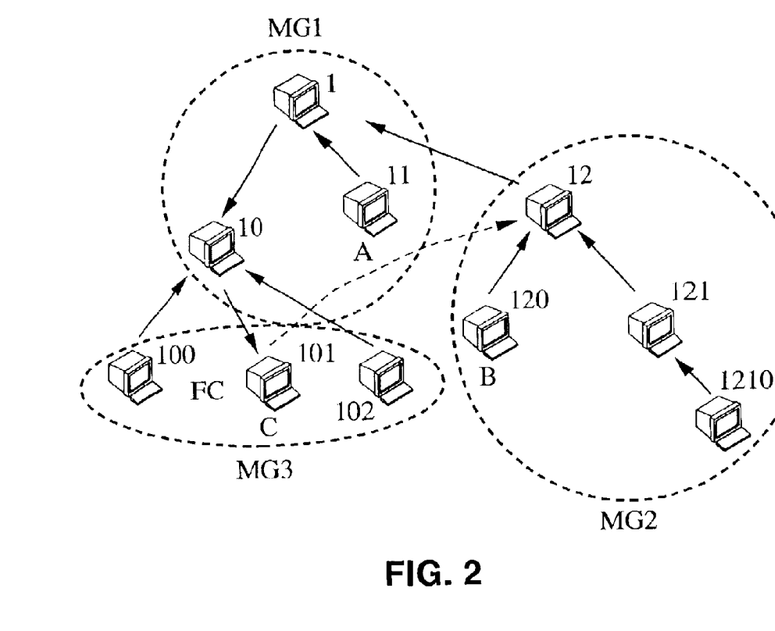
FIG. 2 is a diagram depicting an example of aggregated coordination protocol operation according to the present invention.

Referring to FIG. 2, consider a scenario where three hosts from three different multicast groups MG1, MG2, MG3 must coordinate access to a shared resource for which they are contending. FIG. 2 depicts a snapshot of the protocol operation in a ternary tree.

Assume that hosts 12, 100 and 11 all request the floor held by FC at location 101. All request packets need to be routed along branches of the tree to 101. The prefix property of the labels allows self-routing of these packets. For example, assume that all hosts are informed that host 101 is FC. Host 12 compares its label with the target label. Its prefix matches (1), but the second identifier indicates that the FC is on subtree 0. The request packet is hence sent upward to host 1, which compares its label with the target, and, detecting that 101 is one of its children, sends the packet to host 10, whose label matches the prefix of 101.

This node performs the same comparison and the packet ultimately arrives at FC, which finally grants the floor to node 12. The forwarding of control directives is aggregated, i.e., multiple requests for the same information from different nodes in the tree are assembled in a hop node in the tree, that lies on the path to the target, and are forwarded combined. This limits control traffic and unnecessary propagation of requests that for example cannot be satisfied at a FC node. FC is hence liberated from the need to communicate with every host in the session, and deals only with relevant requests reaching it from neighbor nodes by self-routing.

2.2 Correctness

Assuming that CPs are sent reliably, a node can receive the privilege associated with a CP only if sends a request to the node controlling the associated resource. A message enacting the CP (e.g., grant-floor) can only be sent by a controlling node. The addressing labels in the tree are unique and a CP is only Issued for a specific requesting node. Provided that there is a single holder node for a CP a priori, the protocol will hence continue to assign a CP to exactly one node.

If several nodes send a CP and another node holds the privilege associated with it for an infinite time, a deadlock exists. Reasons may be that the wrong node or no node holds the privilege, it is unreachable, or the propagation of a request fails prematurely. Assuming finite FIFO request queues at each node, a request reaching a control node will eventually be served. For a tree of height h=2, we have a star-based scheme with n=D+1 nodes. A floor will rove between the D+1 nodes. Using induction over the height of the tree, we assume that the liveness argument holds for any height l with 2≦l<h. A tree of height h has one additional level, from where CPs can be sent and must be replied to. Because of the acyclic tree geometry, it is impossible that a CP can be outrun by a moving floor privilege. Assume that a node in the additional level of the tree (the root, or a leaf level of a subtree) sends a CP. The addressing semantics of the protocol ensures that messages are self-routed to this level of the tree and will eventually reach the target node. Finally, although privilege passing may progress during a session, a node may starve by being exempted indefinitely from the allocation process. However, the addressing semantics of ACP and the finite FIFO queue forbid that accepted CPs at a control node are ignored indefinitely. Based OR these qualitative arguments we conjecture that ACP is correct.

2.3 Fairness

Fairness refers to the frequency and duration, by which nodes acquire a privilege on the average for a given period, which is for example the session lifetime, or the lifetime of a shared resource in a session. Network latency, geographic distance and location of nodes, or varying host capabilities can all be factors in causing uneven dissemination patterns of CPs and unfair allocation of floors. Leaf nodes take more time to propagate their requests across the root to a node on the other side of a tree, than nodes just below the root. Shared trees also do not provide shortest paths between a source and its receiver set, which may cause increased latency in CP transfer. It is hence important to establish service policies, which counteract these factors. One simple solution, a "least-recently-served" policy, can be enacted by letting each node maintain a local record of the most recent CPs and their originating nodes. Those nodes are serviced first, which do not appear on the list, or appear last in time or frequency of service.

2.4 Resilience

Previously, we assumed that transfer of CPs and accounting of control information among nodes is failure free. Even we if assume reliable multicasting to ensure that CPs are eventually transferred, the control apparatus may need additional recovery mechanisms to ensure consistency. This applies to regular node failure, control node failure, link failure, or token loss or duplication. Such exceptions can be preempted by redundant dissemination of status information, or by detection of loss and recovery. Regular node or controller failures are typically detected via timeout and recovered with an election protocol, with neighbor nodes providing state updates. Continuation of a split session is possible if the members in each partition agree to continue, e.g., if a quorum exists.

One method to deal with the case that a CP is lost completely or reaches only a subset of nodes is to multicast a CP probe message from a node i to the session remainder. The response time $t_r$ to receive a response is bound by the maximum time for the probe to traverse the longest link, $t_{max}$, plus the time $t_{ack}$ for the receiver nodes to send a positive or negative acknowledgment, $t_r=2t_{max}+t_{ack}$. If the CP is diagnosed as lost, the controller node for the respective floor must regenerate the token and send an update to the session.

2.5 Performance

Attaching positional labels to nodes in a D-ary tree implies an additional storage cost of $\log_2 D$ bits per level in a positional tree of N receivers and height $\log_D N$, i.e., $\lg N$ bits are needed. Using 32-bit labels for designating sources and targets in message headers up to $2^{32}$ hosts can hence be accommodated. Prefix comparison is cheaper for nodes close to the root due to shorter labels. Serving a CP costs $C_{CP}=C_{req}+C_{resp}+C_{upd}$, comprising the cost to send a request to a control node, receive a response, and multicast an update on the new state. We compare the delay in a unicast, multicast, and aggregated: multicast-communication model under full load (each node sends a CP), assuming that the host processing cost for request, response and update packets is equal and normalized. The average path length between nodes is assumed to be the same for all models. $\lambda$ represents the individual processing, packetization and transmission delay for each type of packet.

In unicast, the coordination delay incurs (N−1) requests, replies from control nodes, and updates, where N is the current session size, i.e., $CD_{uc}=3(N-1)\lambda$. In multicast, (N−1) nodes send requests, and the control node multicasts one reply and one update back to the session, i.e., $CD_{mc}=(N+1)\lambda$. In aggregated multicast, CPs are handled within multicast groups and only the root of a group forwards a composite request to its parent, or responds to group-local requests, if it holds the information locally. With K groups we have on the average $$G = \left[\frac{N}{K}\right]$$

members per group, and per group there are G requests inside a group, K aggregated requests sent to a control node from all groups, and one multicast response and update, i.e., $$CD_{amc}=((G-1)+(K-1)+2)\lambda=(G+K)\lambda.$$

Figure 3:
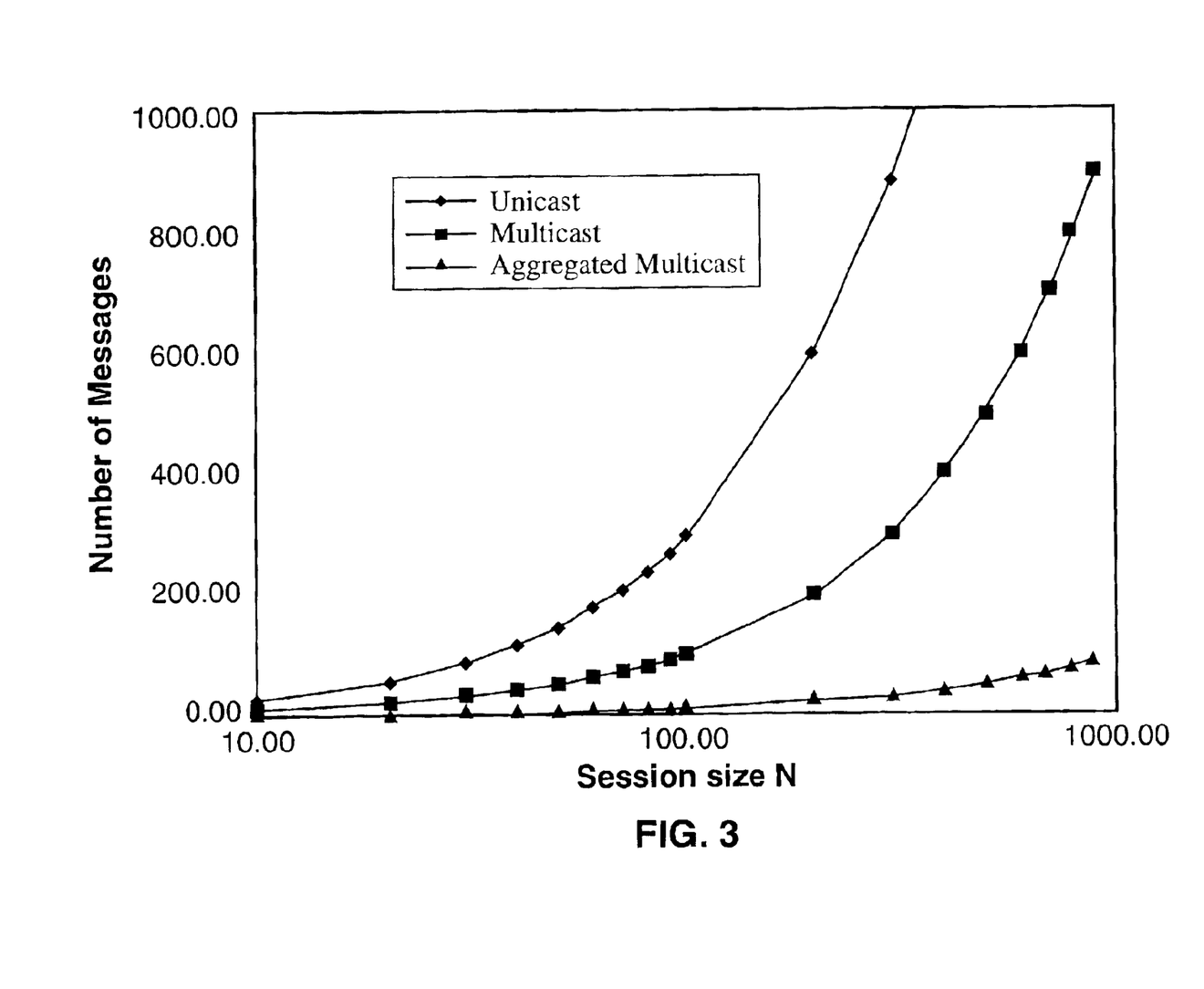
FIG. 3 is a chart comparing the average costs to coordinate hosts using conventional unicast, conventional multicast, and aggregated multicast according to the present invention.

FIG. 3 shows the average cost to coordinate hosts in sessions up to size N=1000, clustered into K=N/10 groups, and with normalized transmission delay $\lambda$. It elicits the benefits of aggregated multicast coordination.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method for coordinating multipoint group members in a multicast network environment, comprising:

transmitting control directives between group members across a shared end-to-end multicast tree;

aggregating the forwarding of said control directives;

wherein multiple requests for the same information from different nodes in the tree are assembled in a hop node in the tree, and are forwarded combined;

wherein if said hop node receives the same control directives from different nodes, said hop node aggregates them into one control directive, and checks if a response to said control directives can be satisfied locally by said hop node by polling its own state and the state of neighboring nodes; and wherein if a response to said control directives cannot be satisfied locally by aid hop node said aggregated control directive is self-routed up or down in the tree toward the target nodes.

2. A method as recited in claim 1, wherein said hop node comprises a node on a path to a target.

3. A method as recited in claim 1, wherein if a target node is in the subtree of a node, the control directive is routed downward the subtree branch where the target resides; and wherein if a target node is not in the subtree of a node, the control directive is sent upward to its parent node.

4. A method as recited in claim 1, further comprising assigning recursively and top-down unique prefix labels to each node joining the tree;

wherein a child node label contains as prefix the label of its parent.

5. A method as recited in claim 1, wherein said tree comprises:

a holder node, said holder node operating on a resource, said holder node being a transmission source, said holder node hosting a floor holder, said holder node being permitted to access a resource at any time;

a control node, said control node hosting a floor controller, said floor controller controlling access and operation for a specific resource, said control node configured for being addressed by other nodes asking for a floor; and a target node, said target node configured for receiving updates of resource operation by a floor holder;

wherein a floor comprises a temporary privilege to work with a resource.

6. A method as recited in claim 1, wherein said tree corresponds to a single shared acknowledgment tree for concurrent multicasting.

7. A method for coordinating multipoint group members in a multicast network environment, comprising:

transmitting control directives between group members across a shared end-to-end multicast tree;

wherein if a target node is in the subtree of a node, the control directive is routed downward the subtree branch where the target resides;

wherein if a target node is not in the subtree of a node, the control directive is sent upward to its parent node; and aggregating the forwarding of said control directives;

wherein multiple requests for the same information from different nodes in the tree are assembled in a hop node in the tree and are forwarded combined;

wherein if said hop node receives the same control directives from different nodes, said hop node aggregates them into one control directive, and checks if a response to said control directives can be satisfied locally by said hop node by polling its own state and the state of neighboring nodes; and wherein if a response to said control directives cannot be satisfied locally by aid hop node said aggregated control directive is self-routed up or down in the tree toward the target nodes.

8. A method as recited in claim 7, wherein said hop node comprises a node on a path to a target.

9. A method as recited in claim 7, further comprising assigning recursively and top-down unique prefix labels to each node joining the tree;

wherein a child node label contains as prefix the label of its parent.

10. A method as recited in claim 7, wherein said tree comprises:

a holder node, said holder node operating on a resource, said holder node being a transmission source, said holder node hosting a floor holder, said holder node being permitted to access a resource at any time;

a control node, said control node hosting a floor controller, said floor controller controlling access and operation for a specific resource, said control node configured for being addressed by other nodes asking for a floor; and a target node, said target node configured for receiving updates of resource operation by a floor holder;

wherein a floor comprises a temporary privilege to work with a resource.

11. A method as recited in claim 7, wherein said tree corresponds to a single shared acknowledgment tree for concurrent multicasting.

12. A method for coordinating multipoint group members in a multicast network environment, comprising:

transmitting control directives between group members across a shared end-to-end multicast tree;

assigning recursively and top-down unique prefix labels to each node joining the tree;

wherein a child node label contains as prefix the label of its parents;

aggregating the forwarding of said control directives;

wherein multiple requests for the same information from different nodes in the tree are assembled in a hop node in the tree, and are forwarded combined;

wherein if said hop node receives the same control directives from different nodes, said hop node appreciates them into one control directive, and checks if a response to said control directives can be satisfied locally by said hop node by polling its own state and the state of neighboring nodes; and wherein if a response to said control directives cannot be satisfied locally by aid hop node said aggregated control directive is self-routed up or down in the tree toward the target nodes.

13. A method as recited in claim 12, wherein said hop node comprises a node on a path to a target.

14. A method as recited in claim 12, wherein if a target node is in the subtree of a node, the control directive is routed downward the subtree branch where the target resides; and wherein if a target node is not in the subtree of a node, the control directive is sent upward to its parent node.

15. A method as recited in claim 12, wherein said tree comprises:

a holder node, said holder node operating on a resource, said holder node being a transmission source, said holder node hosting a floor holder, said holder node being permitted to access a resource at any time;

a control node, said control node hosting a floor controller, said floor controller controlling access and operation for a specific resource, said control node configured for being addressed by other nodes asking for a floor; and a target node, said target node configured for receiving updates of resource operation by a floor holder;

wherein a floor comprises a temporary privilege to work with a resource.

16. A method as recited in claim 12, wherein said tree corresponds to a single shared acknowledgment tree for concurrent multicasting.

17. A method for coordinating multipoint group members in a multicast network environment, comprising:

transmitting control directives between group members across a shared end-to-end multicast tree;

wherein said tree comprises, a holder node, said holder node operating on a resource, said holder node being a transmission source, said holder node hosting a floor holder, said holder node being permitted to access a resource at any time, a control node, said control node hosting a floor controller, said floor controller controlling access and operation for a specific resource, said control node configured for being addressed by other nodes asking for a floor, and a target node, said target node configured for receiving updates of resource operation by a floor holder, wherein a floor comprises a temporary privilege to work with a resource.

18. A method as recited in claim 17, further comprising aggregating the forwarding of said control directives.

19. A method as recited in claim 18, wherein multiple requests for the same information from different nodes in the tree are assembled in a hop node in the tree, and are forwarded combined.

20. A method as recited in claim 19, wherein said hop node comprises a node on a path to a target.

21. A method as recited in claim 19, wherein if said hop node receives the same control directives from different nodes, said hop node aggregates them into one control directive, and checks if a response to said control directives can be satisfied locally by said hop node by polling its own state and the state of neighboring nodes; and wherein if a response to said control directives cannot be satisfied locally by aid hop node said aggregated control directive is self-routed up or down in the tree toward the target nodes.

22. A method as recited in claim 17, wherein if a target node is in the subtree of a node, the control directive is routed downward the subtree branch where the target resides; and wherein if a target node is not in the subtree of a node, the control directive is sent upward to its parent node.

23. A method as recited in claim 17, further comprising assigning recursively and top-down unique prefix labels to each node joining the tree;

wherein a child node label contains as prefix the label of its parent.

24. A method as recited in claim 17, wherein said tree corresponds to a single shared acknowledgment tree for concurrent multicasting.

25. A method for coordinating multipoint group members in a multicast network environment, comprising:

transmitting control directives between group members across a shared end-to-end multicast tree;

wherein said tree corresponds to a single shared acknowledgment tree for concurrent multicasting;

aggregating the forwarding of said control directives;

wherein multiple requests for the same information from different nodes in the tree are assembled in a hop node in the tree, and are forwarded combined;

wherein if said hop node receives the same control directives from different nodes, said hop node aggregates them into one control directive, and checks if a response to said control directives can be satisfied locally by said hop node by polling its own state and the state of neighboring nodes; and wherein if a response to said control directives cannot be satisfied locally by aid hop node said aggregated control directive is self-routed up or down in the tree toward the target nodes.

26. A method as recited in claim 25, wherein said hop node comprises a node on a path to a target.

27. A method as recited in claim 25, wherein if a target node is in the subtree of a node, the control directive is routed downward the subtree branch where the target resides; and wherein if a target node is not in the subtree of a node, the control directive is sent upward to its parent node.

28. A method as recited in claim 25, further comprising assigning recursively and top-down unique prefix labels to each node joining the tree;

wherein a child node label contains as prefix the label of its parent.

29. A method as recited in claim 25, wherein said tree comprises:

a holder node, said holder node operating on a resource, said holder node being a transmission source, said holder node hosting a floor holder, said holder node being permitted to access a resource at any time;

a control node, said control node hosting a floor controller, said floor controller controlling access and operation for a specific resource, said control node configured for being addressed by other nodes asking for a floor; and a target node, said target node configured for receiving updates of resource operation by a floor holder;

wherein a floor comprises a temporary privilege to work with a resource.

30. A method for coordinating multipoint group members in a multicast network environment, comprising:

transmitting control directives between group members across a shared end-to-end multicast tree;

wherein said tree comprises;

a holder node, said holder node operating on a resource, said holder node being a transmission source, said holder node hosting a floor holder, said holder node being permitted to access a resource at any time;

a control node, said control node hosting a floor controller, said floor controller controlling access and operation for a specific resource, said control node configured for being addressed by other nodes asking for a floor; and a target node, said target node configured for receiving updates of resource operation by a floor holder;

wherein a floor comprises a temporary privilege to work with a resource.

31. A method as recited in claim 30, further comprising aggregating the forwarding of said control directives.

32. A method as recited in claim 31, wherein multiple requests for the same information from different nodes in the tree are assembled in a hop node in the tree, and are forwarded combined.

33. A method as recited in claim 31, wherein said hop node comprises a node on a path to a target.

34. A method as recited in claim 32:
wherein if said hop node receives the same control directives from different nodes, said hop node aggregates them into one control directive, and checks if a response to said control directives can be satisfied locally by said hop node by polling its own state and the state of neighboring nodes; and
wherein if a response to said control directives cannot be satisfied locally by aid hop node said aggregated control directive is self-routed up or down in the tree toward the target nodes.

35. A method as recited in claim 30:
wherein if a target node is in the subtree of a node, the control directive is routed downward the subtree branch where the target resides; and
wherein if a target node is not in the subtree of a node, the control directive is sent upward to its parent node.

36. A method as recited in claim 30, further comprising:
assigning recursively and top-down unique prefix labels to each node joining the tree;
wherein a child node label contains as prefix the label of its parent.

37. A method as recited in claim 30, wherein said tree corresponds to a single shared acknowledgment tree for concurrent multicasting.

38. A method for coordinating multipoint group members in a multicast network environment, comprising:
transmitting control directives between group members across a shared end-to-end multicast tree;
wherein if a target node is in the subtree of a node, the control directive is routed downward the subtree branch where the target resides; and
wherein if a target node is not in the subtree of a node, the control directive is sent upward to its parent node;
wherein said tree comprises:
a holder node, said holder node operating on a resource, said holder node being a transmission source, said holder node hosting a floor holder, said holder node being permitted to access a resource at any time;
a control node, said control node hosting a floor controller, said floor controller controlling access and operation for a specific resource, said control node configured for being addressed by other nodes asking for a floor; and
a target node, said target node configured for receiving updates of resource operation by a floor holder;
wherein a floor comprises a temporary privilege to work with a resource.

39. A method as recited in claim 38, further comprising aggregating the forwarding of said control directives.

40. A method as recited in claim 39, wherein multiple requests for the same information from different nodes in the tree are assembled in a hop node in the tree, and are forwarded combined.

41. A method as recited in claim 40, wherein said hop node comprises a node on a path to a target.

42. A method as recited in claim 40:
wherein if said hop node receives the same control directives from different nodes, said hop node aggregates them into one control directive, and checks if a response to said control directives can be satisfied locally by said hop node by polling its own state and the state of neighboring nodes; and
wherein if a response to said control directives cannot be satisfied locally by aid hop node said aggregated control directive is self-routed up or down in the tree toward the target nodes.

43. A method as recited in claim 38, further comprising:
assigning recursively and top-down unique prefix labels to each node joining the tree;
wherein a child node label contains as prefix the label of its parent.

44. A method as recited in claim 38, wherein said tree corresponds to a single shared acknowledgment tree for concurrent multicasting.

45. A method for coordinating multipoint group members in a multicast network environment, comprising:
transmitting control directives between group members across a shared end-to-end multicast tree; and
assigning recursively and top-down unique prefix labels to each node joining the tree;
wherein a child node label contains as prefix the label of its parent;
wherein said tree comprises:
a holder node, said holder node operating on a resource, said holder node being transmission source, said holder node hosting a floor holder, said holder node being permitted to access a resource at any time;
a control node, said control node hosting a floor controller, said floor controller controlling access and operation for a specific resource, said control node configured for being addressed by other nodes asking for a floor; and
a target node, said target node configured for receiving updates of resource operation by a floor holder;
wherein a floor comprises a temporary privilege to work with a resource.

46. A method as recited in claim 45, further comprising:
aggregating the forwarding of said control directives.

47. A method as recited in claim 46, wherein multiple requests for the same information from different nodes in the tree are assembled in a hop node in the tree, and are forwarded combined.

48. A method as recited in claim 47, wherein said hop node comprises a node on a path to a target.

49. A method as recited in claim 47:
wherein if said hop node receives the same control directives from different nodes, said hop node aggregates them into one control directive, and checks if a response to said control directives can be satisfied locally by said hop node by polling its own state and the state of neighboring nodes; and
wherein if a response to said control directives cannot be satisfied locally by aid hop node said aggregated control directive is self-routed up or down in the tree toward the target nodes.

50. A method as recited in claim 45:
wherein if a target node is in the subtree of a node, the control directive is routed downward the subtree branch where the target resides; and wherein if a target node is not in the subtree of a node, the control directive is sent upward to its parent node.

51. A method as recited in claim 45, wherein said tree corresponds to a single shared acknowledgment tree for concurrent multicasting.

52. A method for coordinating multipoint group members in a multicast network environment, comprising:

transmitting control directives between group members across a shared end-to-end multicast tree;

wherein said tree corresponds to a single shared acknowledgment tree for concurrent multicasting;

wherein said tree comprises:

a holder node, said holder node operating on a resource, said holder node being a transmission source, said holder node hosting a floor holder, said holder node being permitted to access a resource at any time;

a control node, said control node hosting a floor controller, said floor controller controlling access and operation for a specific resource, said control node configured for being addressed by other nodes asking for a floor; and a target node, said target node configured for receiving updates of resource operation by a floor holder;

wherein a floor comprises a temporary privilege to work with a resource.

53. A method as recited in claim 52, further comprising: aggregating the forwarding of said control directives.

54. A method as recited in claim 52, wherein multiple requests for the same information from different nodes in the tree are assembled in a hop node in the tree, and are forwarded combined.

55. A method as recited in claim 54, wherein said hop node comprises a node on a path to a target.

56. A method as recited in claim 54:

wherein if said hop node receives the same control directives from different nodes, said hop node aggregates them into one control directive, and checks if a response to said control directives can be satisfied locally by said hop node by polling its own state and the state of neighboring nodes; and wherein if a response to said control directives cannot be satisfied locally by aid hop node said aggregated control directive is self-routed up or down in the tree toward the target nodes.

57. A method as recited in claim 52:

wherein if a target node is in the subtree of a node, the control directive is routed downward the subtree branch where the target resides; and wherein if a target node is not in the subtree of a node, the control directive is sent upward to its parent node.

58. A method as recited in claim 52, further comprising:

assigning recursively and top-down unique prefix labels to each node joining the tree;

wherein a child node label contains as prefix the label of its parent.

* * * * *